R. L. Smith,
Twine-Holder.
No. 85,618. Patented Jan. 5, 1869.
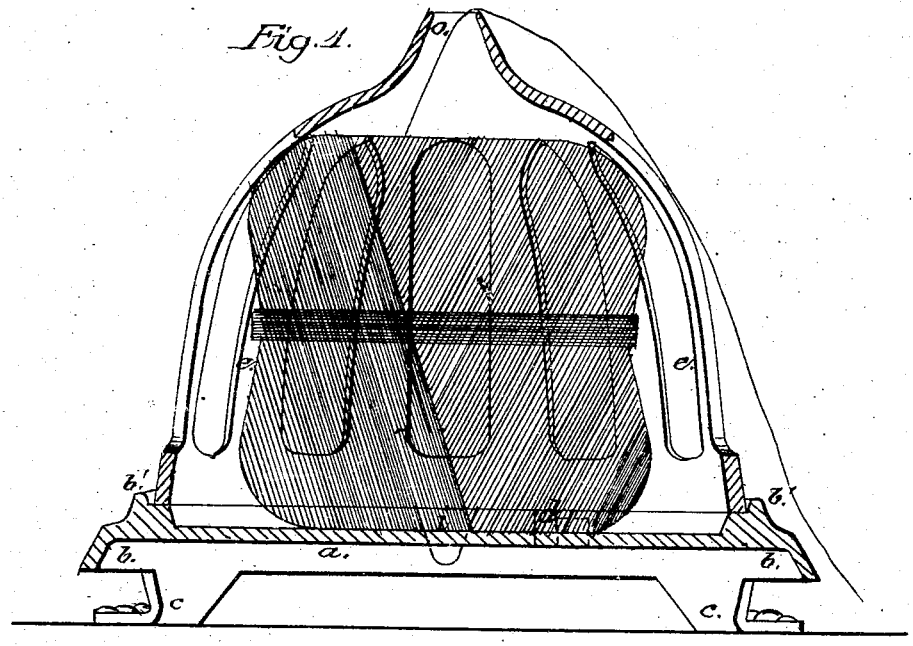
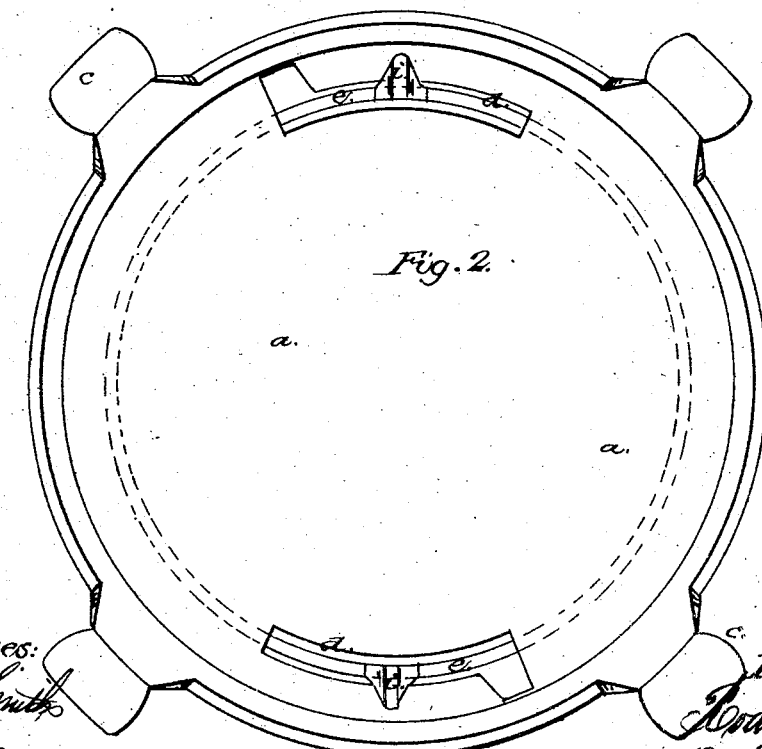
Witnesses:
Chas. H. Smith
Geo. D. Walker
Inventor:
Rodney L. Smith
By Lemuel W. Serrell
Atty.

RODNEY L. SMITH, OF WOLCOTTVILLE, CONNECTICUT.

Letters Patent No. 85,618, dated January 5, 1869.

IMPROVED TWINE-HOLDER.

The Schedule referred to in these Letters Patent and making part of the same.

*To all whom it may concern:*

Be it known that I, RODNEY L. SMITH, of Wolcottville, in the county of Litchfield, and State of Connecticut, have invented, made, and applied to use a certain new and useful Improvement in Twine-Holders; and I do hereby declare the following to be a full, clear, and exact description of the said invention, reference being had to the annexed drawing, making part of this specification, wherein—

Figure 1 is a vertical section of my said twine-holder, the ball of twine being represented by blue lines, and Figure 2 is an inverted plan of the said twine-holder.

Similar letters denote the same parts.

This twine-holder is intended for standing on a counter, and containing the ball of twine, and allowing it to be used as occasion requires, or replenished with rapidity.

My invention consists in a metallic base, formed with slots for receiving the interlocking projections upon the lower edges of a hollow open-work dome that sets over the ball of twine, keeping it in position, but allowing the twine to be drawn off as used, and by a partial rotation the lugs and slots are separated, so that the dome can be removed and a ball of twine introduced.

In the drawing, $a$ represents a plate, of circular shape, with a rim, $b$ $b'$, around it, and supported by feet, $c$ $c$, the whole forming a base for the twine-holder.

Through this plate $a$ segmental slots, $d$ $d$, are formed with an enlargement toward one end of each slot, and $e$ is the dome, formed of open-work, with lugs $i$ $i$ projecting below its lower edge, and these lugs are L-shaped, or formed with heads that pass through the larger parts of the slots $d$, so that by giving the dome a partial rotation, the dome $e$ will be firmly locked to the base, $a$, by the heads or projections of the lugs $i$, taking beneath the plate $a$, and at this point the plate $a$ may be slightly thicker, so as to wedge the said head and bind the dome tightly to place upon the plate $a$. The reverse motion allows the dome $e$ to be removed.

The rim $b'$ keeps the dome $e$ from moving laterally, and the hole or eye $o$ allows the twine to be drawn out from the ball with great facility.

This twine-holder is strong, easily made, of cast-metal; cheap, and sufficiently heavy to stand firmly in its place.

I do not claim a twine-holder, of a dome-shape, standing on legs, and provided with a false bottom to be taken out for introducing the ball of twine, when the entire holder is turned upside down. This prevents the base of the twine-holder being fastened to any particular place and involves the necessity of inverting the holder, in case the twine becomes tangled, instead of simply lifting the light open-work dome, as in my twine-holder.

What I claim, and desire to secure by Letters Patent, is—

The twine-holder, formed of the base $a$ and rim $b$, supported by the feet $c$, in combination with the removable dome $e$, locked to the base, as, and for the purposes specified.

In witness whereof, I have hereunto set my signature, this 7th day of September, 1868.

RODNEY L. SMITH.

Witnesses:
HENRY S. BARBOUR,
CHS. F. CHURCH.